United States Patent [19]

Jennings, Jr.

[11] Patent Number: 5,320,172

[45] Date of Patent: Jun. 14, 1994

[54] METHOD FOR IMPROVING CEMENT PLACEMENT IN HORIZONTAL WELLS

[75] Inventor: Alfred R. Jennings, Jr., Plano, Tex.

[73] Assignee: Mobil Oil Corporation, Fairfax, Va.

[21] Appl. No.: 952,129

[22] Filed: Sep. 28, 1992

[51] Int. Cl.$^5$ .......................................... E21B 33/14
[52] U.S. Cl. ..................... 166/291; 166/50; 166/292; 166/312
[58] Field of Search ............... 166/50, 285, 291, 292, 166/312

[56] References Cited

U.S. PATENT DOCUMENTS

| | | | |
|---|---|---|---|
| 3,526,280 | 9/1970 | Aulick | 166/285 |
| 3,866,683 | 2/1975 | Maly et al. | 166/292 |
| 3,902,911 | 9/1975 | Messenger | |
| 4,120,360 | 10/1978 | Messenger | 166/293 |
| 4,386,665 | 6/1983 | Dellinger | 175/61 |
| 4,860,830 | 8/1989 | Jennings, Jr. et al. | 166/312 |
| 4,869,323 | 9/1989 | Stagg | 166/285 |
| 5,027,900 | 7/1991 | Wilson | 166/50 X |
| 5,095,987 | 3/1992 | Weaver et al. | 166/50 X |
| 5,188,176 | 2/1993 | Carpenter | 166/50 X |
| 5,211,238 | 5/1993 | Carpenter | 166/292 |

Primary Examiner—George A. Suchfield
Attorney, Agent, or Firm—Alexander J. McKillop; George W. Hager, Jr.; Charles A. Malone

[57] ABSTRACT

A well completion process for improved cement placement in a horizontal wellbore where a fluid is circulated down the wellbore for conditioning and cleaning it. Afterwards, a production tube containing centralizers is positioned centrally within the wellbore. Next, a "spacer fluid" is circulated within an annulus formed by the space between the tube and the wellbore so as to clean the annulus out. Subsequently, a cement having a density greater than the spacer fluid is pumped into the annulus. Thereafter, a light weight cement is pumped into the annulus thereby overriding the heavier cement and removing voids in the annulus resulting in more efficient cement placement.

3 Claims, 1 Drawing Sheet

METHOD FOR IMPROVING CEMENT PLACEMENT IN HORIZONTAL WELLS

FIELD OF THE INVENTION

This invention is directed to a method for improved cementing of a well located in an underground formation. More particularly, it is directed to the effective cementing of a horizontal wellbore.

BACKGROUND OF THE INVENTION

With advances in drilling technology, it is currently possible to drill horizontal wellbores deep into hydrocarbon producing reservoirs. There are many advantages to a horizontal well completion including extending contact with a producing formation thereby facilitating drainage and production of the reservoir.

Although horizontal wellbores allow more contact with the producing formation, one encounters some difficulties in well completions associated with horizontal wellbores not commonly dealt with in vertical wells. One area of concern in well completions is the inability to effectively cement voids along the horizontal section during a cementing operation. Effective cementing of the tubing to the wellbore is routinely accomplished in vertical wellbores. However, in horizontal wellbores and severely inclined wellbores, i.e. those having an angle of deviation greater than about 45°, cementing is much more difficult. Therefore, the efficiency of zone isolation diminishes considerably.

In oil and gas well completions it is imperative to effectively isolate the oil or gas bearing formation from other zones in the wellbore. This is most frequently accomplished by cementing the production casing in place and then perforating the wellbore in the production horizon to allow hydrocarbon flow into the wellbore. With effective cementing, flow up the outside of the production casing is eliminated and the oil and/or gas producing zone is effectively isolated.

Often a failure of the cementing operation occurs in horizontal wellbores because the density of the cement does not allow sufficient displacement of drilling mud and other residue from the tubing/wellbore annulus, thereby resulting in channeling of cement and improper tubing or pipe/formation bonding.

Therefore, what is needed is a method for improving the effectiveness of the cementing operation in deviated or horizontal wellbores which allows the removal of void spaces in the horizontal section due to incomplete displacement of wellbore materials and the effects of gravity on high density cement.

SUMMARY OF THE INVENTION

This invention is directed to a well completion process for improved cement placement in a horizontal wellbore located in a formation having productive and non-productive intervals. In the practice of this invention, a cleaning fluid is circulated down the wellbore in an amount and for a time sufficient to condition and clean the wellbore for cementing a production tubing or casing in place.

Afterwards, a production tubing having centralizers therearound is placed into the wellbore so as to locate the tubing centrally within the wellbore. Next, a cement "spacer" fluid is directed down an annular space formed between the tubing and the wellbore so as to substantially clean-out this space in order to provide better bonding. Later, a first cement is directed down the annular space or annulus and up the tubing which cement has a density greater than the cement spacer fluid and is in an amount sufficient to fill the annulus. Subsequently, a second cement is directed down the annulus and up the tubing. This cement has a density less than the density of the first cement which causes it to override the first cement thereby filling any voids along the horizontal section which were unfilled by the first cement so as effectively isolate the casing from the formation.

It is therefore an object of this invention to effectively clean debris such as drilling mud or other drilling residues from a horizontal wellbore prior to cementing the casing therein.

It is another object of this invention to remove "voids" from a horizontal wellbore which were caused by the incomplete displacement of a high density cement therein.

It is yet another object of this invention to effectively cement a horizontal wellbore so as to prevent cement channeling and thereby effectively isolate an oil or gas bearing zone of the formation from other zones.

DESCRIPTION OF THE PREFERRED EMBODIMENTS

This invention is directed to a well completion process for improved cement placement in a horizontal wellbore which is located in a hydrocarbonaceous fluid bearing formation. In the practice of this invention, a cleaning fluid is directed down said wellbore in an amount and for a time sufficient to condition and clean it so as to enable a production tubing or casing to be cemented in place. One cleaning fluid which can be utilized is described in U.S. Pat. No. 3,866,683 which issued to Maly et al. on Feb. 18, 1975. This patent is hereby incorporated by reference herein. This patent describes a gel preflush fluid which comprises a highly gelled suspension of a hydratable clay in fresh water, i.e., water having less than about 1 wt. % of dissolved salts. Upon being mixed into water, the hydratable clays form colloidal dispersions that exhibit increased viscosity and gel strength. It is well known that various clays of the bentonite, kaolin and hydrous mica groups exhibit these properties to varying degrees. Exemplary of the hydratable clays in the kaolin group are kaolinite, halloysite, dickite, nacrite and endellite. The bentonite group includes montmorillonite, beidelite, nontronite, hectorite and saponite. Exemplary of the hydrous micas are bravaisite or illite. Finely ground bentonite is a particularly preferred hydratable clay for use in the gelled preflush fluid. Commercial bentonite is an earth material consisting principally of sodium montmorillonite. This patent also describes the various mixing procedures and requirements. It additionally describes an abradent material which can be added to the gelled preflush to enhance its drilling fluid and mud cake removal capabilities.

Figure 1:
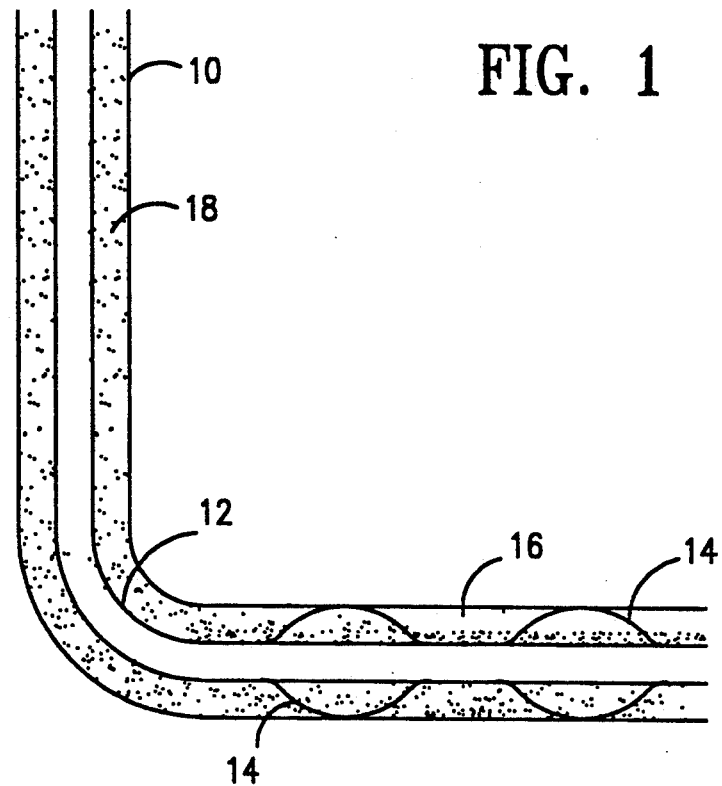
FIG. 1 is a schematic representation which depicts an inclined wellbore having centralizers therearound which details a void space in said wellbore.

It is well known in the art how to drill deviated boreholes into a formation. One method for drilling a deviated wellbore wherein multi-penetration of a mineral bearing formation is undertaken is described in U.S. Pat. No. 4,386,665 which issued to Dellinger on Jun. 7, 1983. This patent is hereby incorporated by reference herein. An example of a deviated wellbore is shown in FIG. 1. Once the deviated wellbore has been directed into the formation as desired and the cleaning fluid has removed the debris, mud, or drilling fluid from the horizontal wellbore, a production tubing or casing 12 is directed down borehole 10. In order to locate the tubing or casing in wellbore 10, pipe centralizers 14 are placed around the tubing prior to directing it into the wellbore. Once in wellbore 10, casing 12 or tubing is centralized therein as is shown in FIG. 1.

After positioning the production tubing or casing 12 centrally in the wellbore as desired, a cement spacer of fluid is directed down the annulus formed by the production tubing or casing inside of wellbore 10. This cement spacer of fluid which can be used herein can comprise the cleaning fluid which was directed down the wellbore initially. Other spacer fluids which can be used herein comprise aqueous fluids of sodium chloride, potassium chloride, calcium chloride and zinc chloride in a technique described by Jennings, Jr. et al. in U.S. Pat. No. 4,860,830. This patent is hereby incorporated by reference herein. Once the spacer fluids have been directed down the annulus in an amount sufficient to substantially clean-out the wellbore, circulation of the cement spacer fluid down the annulus is terminated.

After terminating the circulation of the cement spacer fluid down the annulus and up through the casing or tubing 12 for a time sufficient to substantially remove all of the debris from the wellbore, a cement slurry is introduced into the annulus. As is shown in FIG. 1 the cement slurry flows down the annulus and up the tubing or casing 12. Since the cement which is first directed down the annulus is heavy, gravitational forces on said cement causes void space 16 to remain after the cement has been forced down the annulus. This happens since the heavy cement is pulled to the bottom of the horizontal tubing or casing as it flows the annulus. The term "cement slurry" is intended to include hydraulic aqueous slurries of hydraulic and pozzolan cement. Exemplary hydraulic cements include portland cement, either of the normal, high early strength or slow setting types; mixtures of lime, silica and aluminum; mixtures of lime, magnesium, silica, alumina or iron oxide; hydraulic limes, drapper cement; pozzolan, and natural cements. The pozzolan cements include a cement made from slaked lime and granulated blast furnace slag.

Most wells cementing operation employ Portland cement meeting API specifications. These are introduced into the well as a neat slurry in which the weight ratio of water to cement is between about 0.25 and 0.65 (i.e., 3–10 gallons of water per sack of cement). Once the first cement has been directed down the annulus and up production tubing or casing 12 for a desired amount of time to obtain the desired volume of cement in the annulus, flow of the first cement down said annulus and up the tubing is ceased. The first cement slurry which is directed down the annulus and up the tubing will have a density greater than the cement spacer of fluid.

Figure 2:
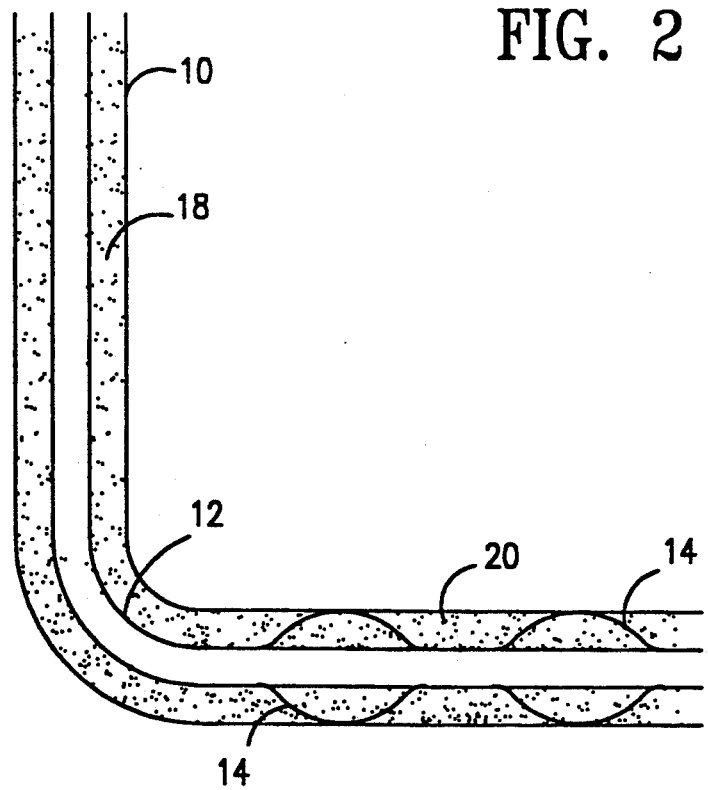
FIG. 2 is a schematic representation of an inclined wellbore which shows removal of the void and more complete cementing of the pipe through the use of a combination of high density and low density cements.

Before the first cement sets or hardens, a second cement slurry is directed down the annulus and up the tubing at a rate and pressure sufficient to override the first cement thereby filling any void spaces 16 which appear along horizontal wellbore 10. This second cement has a density less than the first cement and is therefore unable to displace the first denser cement. The second cement is directed down the wellbore to fill any voids which were unfilled by the first cement so as to effectively isolate the production tubing or casing 10 from the formation. Once the second light cement has been directed down the annulus as desired, both cements will appear as shown in FIG. 2. Both cements are allowed to remain in the annulus for a time sufficient to harden. Once hardened, the combined cements effectively bond the casing to the borehole since all voids are removed from the annulus. Thus, the formation is effectively sealed off from the tubing along its entire length thereby preventing the channeling of undesired fluids into subsequently perforated areas of the wellbore during production of desired fluids from the formation. Representative low density cements which can be utilized herein comprise foamed cements and "SPHERE-LITE" light cement sold by Halliburton Company located in Ducan, Okla. Similar cement compositions are disclosed in U.S. Pat. Nos. 3,902,911 and 4,120,360 which are hereby incorporated by reference herein.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A well completion process for improved cement placement in a horizontal wellbore located in a formation comprising:
   a) circulating a cleaning fluid down the wellbore in an amount and for a time sufficient to condition and clean it for cementing a production tubing or casing in place;
   b) directing a production tubing with centralizers therearound into the wellbore thereby locating the tubing centrally within the wellbore;
   c) directing a cement spacer fluid down an annulus formed between the tubing and wellbore so as to substantially clean-out the wellbore;
   d) directing a first cement slurry down the annulus and up the tubing which cement slurry has a density greater than the cement spacer fluid and is in an amount sufficient to fill the annulus; and
   e) directing a second cement slurry down the annulus which cement slurry has density less than the density of the first cement slurry and which overrides the first cement slurry thereby filling any voids that were unfilled by the first cement slurry so as to effectively isolate the casing from the formation.

2. The method as recited in claim 1 where the second cement slurry comprises a light weight cement or a foamed cement.

3. The method as recited in claim 1 where the first cement slurry comprises a hydraulic cement and the second cement slurry comprises a light weight or foamed cement.

* * * * *